April 2, 1940.  W. A. CURTIS  2,195,530
THREAD PROTECTOR
Filed June 17, 1939
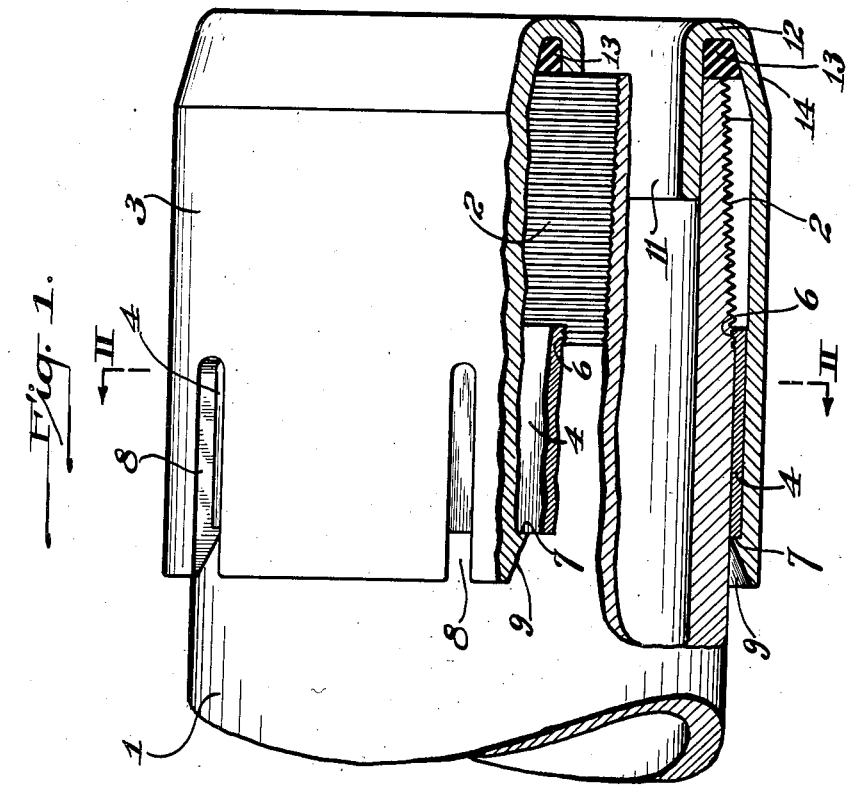
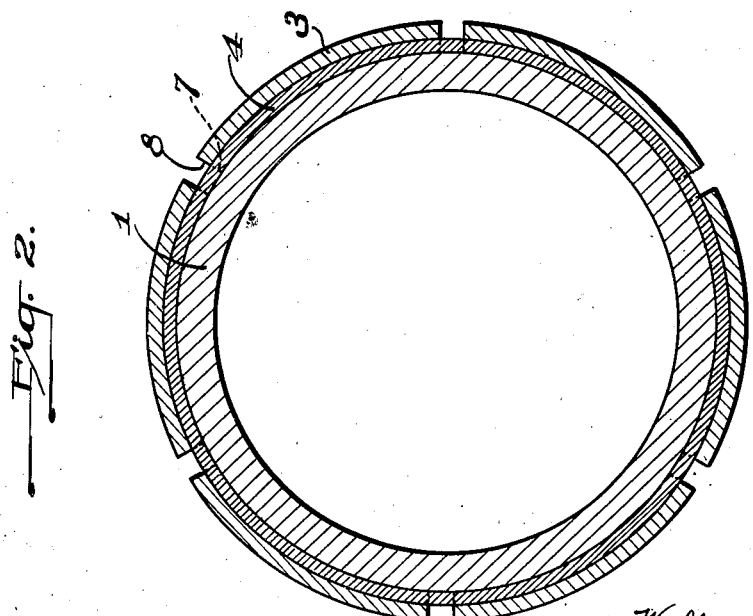
INVENTOR.
Walter A. Curtis
BY Brown, Critchlow & Flick
his ATTORNEYS.

Patented Apr. 2, 1940

2,195,530

UNITED STATES PATENT OFFICE 2,195,530

THREAD PROTECTOR

Walter A. Curtis, Aliquippa, Pa., assignor of one-fifth to Frederick F. Murphy, Aliquippa, Pa.

Application June 17, 1939, Serial No. 279,718

4 Claims. (Cl. 138—96)

This invention relates to protectors for the threaded ends of pipes.

Although a great many thread protectors have been proposed and used, so far as I am aware there is no satisfactory protector than can be left on a pipe while it is being tested under pressure. The reason for this apparently is either that the testing fluid leaks out between the protector and pipe threads, or the threads on the protector that hold it in place do not withstand the mechanical pressure placed on them by the testing head forced against the outer end of the protector. Consequently, as soon as a pipe is made a thread protector is applied to it, is removed to permit testing, and is then replaced before the pipe is shipped out. This, of course, requires time and expense, besides being troublesome.

It is among the objects of this invention to provide a pipe thread protector of relatively simple and inexpensive construction which effectively protects the threads against injury, which does not need to be removed while the pipe is being tested, which seals the end of the pipe against leakage under the high hydraulic pressures of pipe testing, and which is not damaged or impaired in any way by the force of the testing head against it.

In accordance with this invention a metal sleeve that is somewhat larger than the pipe to be protected is fitted over or in the threaded end of the pipe. This sleeve is spaced from the pipe and its threads by means of a bushing or collar engaging the pipe between it and the sleeve. The bushing is detachably held in place at the inner end of the threads by a thread or the like registering with one of the innermost threads of the pipe which are the usual imperfect ones. The inner end of the sleeve is provided with a radial shoulder for engaging the inner end of the bushing to limit outward movement of the sleeve relative to it and thereby lock the sleeve in place. To permit the shoulder to be slid across the bushing into locking position, the inner end portion of the sleeve is slit or slotted longitudinally. The opposite or outer end of the sleeve is provided with a radial flange that overlies the end of the pipe and has a cylindrical extension projecting back along the pipe substantially in engagement with its cylindrical surface. The space between the flange and end of the pipe is sealed by packing material. If desired, the outer end portion of the pipe may be tapered for receiving a pressure testing head by which the pipe is tested.

The preferred embodiment of the invention is illustrated in the accompanying drawing in which Fig. 1 is a side view, partly in section, of my thread protector in place on a pipe; and Fig. 2 is a transverse section through the protector and pipe taken on the line II—II of Fig. 1.

Referring to Fig. 1 of the drawing, a pipe 1 has an external thread 2 at one end which is encircled by an annular member or sleeve 3 that extends inwardly a material distance beyond the thread. The sleeve, which is larger than the pipe, is uniformly spaced therefrom by means of a cylindrical collar or bushing 4 disposed in the sleeve and encircling the pipe at the inner end of or behind the thread. This bushing is locked in place by providing its outer end with a thread 6 or other projection that registers with one of the innermost or imperfect threads of the pipe.

The bushing also serves as means for locking the sleeve on the pipe. For this urpose the inner end of the sleeve is provided with an internal shoulder 7 that engages the inner end of the bushing. To permit this shoulder to be expanded sufficiently to slide inwardly across the bushing to locking position, the inner end portion of the sleeve is provided with a plurality of circumferentially spaced longitudinal slots 8, as shown in Figs. 1 and 2. Expansion of shoulder 7 by contact with the outer end of the bushing is facilitated by connecting the shoulder to the inner end of the sleeve by an inclined or diverging wall 9. This wall forms with the encircled pipe an annular recess in which an expanding tool may be inserted for expanding the shoulder to permit the sleeve to be removed from the bushing.

The outer portion of the sleeve is held concentric with the pipe by an internal cylindrical portion 11 that engages the inner wall of the pipe and is connected at its outer end by a radial flange 12 to the end of the sleeve. This flange overlies the end of the pipe from which it is spaced, and this space is filled with a resilient packing material 13. The outer wall of the pipe is preferably tapered at its outer end, as at 14, so that it will connect with a pressure-testing head more satisfactorily.

When the testing head (not shown) is forced against the outer end of the sleeve it squeezes the packing material between the flange and pipe end tightly enough to prevent the fluid under pressure within the pipe from escaping through the protector. The inward movement of the sleeve on the bushing that permits this compressing of the packing is permitted by the telescoping fit between sleeve and bushing. As the sleeve has no threads connecting it to the pipe or bushing, it can be moved longitudinally of the pipe without danger of shearing or damaging any threads. Consequently, this protector does not have to be removed from the pipe to permit the latter to be tested.

According to the provisions of the patent statutes, I have explained the principle and construction of my invention and have illustrated and described what I now consider to represent its best embodiments. However, I desire to have it understood that, within the scope of the appended claims, the invention may be practiced otherwise than as specifically illustrated and described.

I claim:

1. A thread protector for a pipe having a threaded end, comprising a bushing adapted to engage the pipe behind its thread and having means at its outer end for registering with one of the innermost pipe threads, an annular member adapted to be disposed concentric with the pipe thread in radially spaced relation thereto, said member being disposed in telescoping relation with the bushing, the inner end of said annular member having a radial shoulder for engaging the inner end of the bushing to lock said member thereto and the inner end portion of the annular member being slit longitudinally to permit said shoulder to be slid across the bushing to locking position, the outer end of the annular member having a radial flange overlying and spaced from the end of the pipe, and resilient packing material disposed between said flange and pipe end, whereby said sleeve can be moved inwardly across the bushing to tightly compress said packing material.

2. A thread protector for a pipe having an outside thread, comprising a bushing adapted to encircle the pipe behind its thread and having means at its outer end for registering with one of the innermost pipe threads, a sleeve adapted to encircle the pipe thread in spaced relation thereto and telescoping over the bushing, the inner end of the sleeve having an internal shoulder for engaging the inner end of the bushing to lock the sleeve thereon and the inner end portion of the sleeve being slit longitudinally to permit said shoulder to be expanded and slid over the bushing to locking position, the outer end of the sleeve having an inturned flange overlying and spaced from the end of the pipe, the inner edge of said flange having an integral cylindrical extension projecting back into the pipe substantially in engagement with the inner surface of the pipe, and resilient packing material disposed between said flange and pipe end, whereby said sleeve can be moved inwardly across the bushing to tightly compress said packing material.

3. A thread protector for a pipe having an outside thread, comprising a bushing adapted to encircle the pipe behind its thread and having means at its outer end for registering with one of the innermost pipe threads, a sleeve adapted to encircle the pipe thread in spaced relation thereto and telescoping over the bushing, the inner end of the sleeve having an internal shoulder for engaging the inner end of the bushing to lock the sleeve thereon and the inner end portion of the sleeve being slit longitudinally to permit said shoulder to be expanded and slid over the bushing to locking position, the outer end of the sleeve being tapered for receiving a pipe-testing pressure head and having an inturned flange overlying and spaced from the end of the pipe, and resilient packing material disposed between said flange and pipe end, whereby said sleeve can be moved inwardly across the bushing to tightly compress said packing material.

4. A thread protector for a pipe having an outside thread, comprising a bushing adapted to encircle the pipe behind its thread and having means at its outer end for registering with one of the innermost pipe threads, a sleeve adapted to encircle the pipe thread in spaced relation thereto and telescoping over the bushing, the inner end of the sleeve having an internal shoulder for engaging the inner end of the bushing to lock the sleeve thereon and the inner end portion of the sleeve being slit longitudinally to permit said shoulder to be expanded and slid over the bushing to locking position, said shoulder being connected to the inner end of the sleeve by a diverging wall, the outer surface of the sleeve being free of projections and the outer end of the sleeve having an inturned flange overlying and spaced from the end of the pipe, and resilient packing material disposed between said flange and pipe end.

WALTER A. CURTIS.